United States Patent
Clauset et al.

(10) Patent No.: US 11,409,814 B2
(45) Date of Patent: Aug. 9, 2022

(54) SYSTEMS AND METHODS FOR CRAWLING WEB PAGES AND PARSING RELEVANT INFORMATION STORED IN WEB PAGES

(71) Applicant: The Regents of the University of Colorado, Denver, CO (US)

(72) Inventors: Aaron Clauset, Louisville, CO (US); Allison C. Morgan, Boulder, CO (US); Samuel F. Way, Boulder, CO (US)

(73) Assignee: The Regents of the University of Colorado, Denver, CO (US)

( * ) Notice: Subject to any disclaimer, the term of this patent is extended or adjusted under 35 U.S.C. 154(b) by 247 days.

(21) Appl. No.: 16/768,420

(22) PCT Filed: Nov. 29, 2018

(86) PCT No.: PCT/US2018/062975
§ 371 (c)(1),
(2) Date: May 29, 2020

(87) PCT Pub. No.: WO2019/108740
PCT Pub. Date: Jun. 6, 2019

(65) Prior Publication Data
US 2020/0293581 A1 Sep. 17, 2020

Related U.S. Application Data

(60) Provisional application No. 62/593,804, filed on Dec. 1, 2017.

(51) Int. Cl.
*G06F 16/951* (2019.01)
*G06K 9/62* (2022.01)
*G06F 40/205* (2020.01)

(52) U.S. Cl.
CPC ......... *G06F 16/951* (2019.01); *G06K 9/6267* (2013.01); *G06F 40/205* (2020.01)

(58) Field of Classification Search
CPC .... G06F 16/951; G06F 40/205; G06K 9/6267
See application file for complete search history.

(56) References Cited

U.S. PATENT DOCUMENTS

2011/0119263 A1* 5/2011 Hamada ................ G06F 16/951
707/726

* cited by examiner

*Primary Examiner* — Etienne P Leroux
(74) *Attorney, Agent, or Firm* — Faegre Drinker Biddle & Reath LLP

(57) ABSTRACT

Embodiments herein provide for a more efficient web crawler (102) that accesses a plurality of links from a web page (106). In certain embodiments, the web crawler (102) determines link scores for each of the plurality of links, with each link score corresponding to a probability that the associated link leads to a web page (106) of a target page type. The plurality of links and the associated link scores are added to a priority queue (114). The web crawler (102) accesses a second web page (106) using the highest-ranked link in the priority queue (114), obtains links from that web page (106), identifies a link score for each of those links, and adds those links to the priority queue (114) based on their link scores. This process can be repeated for several pages, as needed, using the highest-rank link in each instance, until the crawler (102) identifies a web page (106) of a target page type.

20 Claims, 8 Drawing Sheets ural Application
SYSTEMS AND METHODS FOR CRAWLING WEB PAGES AND PARSING RELEVANT INFORMATION STORED IN WEB PAGES

RELATED APPLICATIONS

This application is the National Stage of International Patent Application PCT/US2018/062975, filed Nov. 29, 2018, which claims priority to U.S. Provisional Application No. 62/593,804, filed Dec. 1, 2017, the contents of each of which are incorporated herein by reference in their entirety for all purposes.

STATEMENT REGARDING GOVERNMENT FUNDING

This invention was made with government support under grant number SMA1633791 awarded by the National Science Foundation. The government has certain rights in the invention.

TECHNICAL FIELD

Embodiments of the present invention generally relate to improved systems and methods for crawling web pages. In particular, certain embodiments relate to devices, systems, and methods for performing focused web crawling to collect relevant information stored in web pages.

BACKGROUND

The Internet contains billions of webpages, and the information contained on those web pages varies across the scope of human ingenuity. However, because of the massive amount of information available on those billions of webpages, technical tools are needed to sort through those webpages to find information relevant to a particular endeavor. A web crawler is one such tool. Some existing web crawlers are used and distributed in a computer network for collecting relevant information stored in publicly available web pages. However, compiling information over the computer network is difficult and time-consuming, thereby complicating efforts to collect the information. In particular, webpages are often interlinked in complicated organizational patterns, making it hard to identify which pages and subpages have the relevant information, especially when there are no central listings or databases. For example, FIG. 6 shows a hyperlink network with nodes representing individual pages and subpages within that network, as well as a "home" icon 600 identifying the homepage for that network. Also shown in FIG. 6 with a "star" icon 602 is the page within that network containing target information, as well as a larger dot 604 showing an intermediate page between the homepage and the target webpage. Existing web crawlers search through pages and subpages in a linear fashion or in a haphazard fashion, as part of a brute force method that requires large amounts of processing power and memory storage. In those situations, quantifying composition and dynamics of the information collected from the web pages is computationally inefficient. For example, considering the network shown in FIG. 6, existing web crawlers will search through many pages and subpages, exploring the links in each accessed page in a linear fashion until it eventually reaches the target webpage—in some instances only after first analyzing hundreds or thousands of irrelevant webpages. As such, there are opportunities to develop an improved web crawling system and method that can more efficiently collect desired information from the web pages and facilitate a cost-effective and automated information collection process.

As the terms are used herein with respect to measurements (e.g., dimensions, characteristics, attributes, components, etc.), and ranges thereof, of tangible things (e.g., products, inventory, etc.) and/or intangible things (e.g., data, electronic representations of currency, accounts, information, portions of things (e.g., percentages, fractions), calculations, data models, dynamic system models, algorithms, parameters, etc.), "about" and "approximately" may be used, interchangeably, to refer to a measurement that includes the stated measurement and that also includes any measurements that are reasonably close to the stated measurement, but that may differ by a reasonably small amount such as will be understood, and readily ascertained, by individuals having ordinary skill in the relevant arts to be attributable to measurement error; differences in measurement and/or manufacturing equipment calibration; human error in reading and/or setting measurements; adjustments made to optimize performance and/or structural parameters in view of other measurements (e.g., measurements associated with other things); particular implementation scenarios; imprecise adjustment and/or manipulation of things, settings, and/or measurements by a person, a computing device, and/or a machine; system tolerances; control loops; machine-learning; foreseeable variations (e.g., statistically insignificant variations, chaotic variations, system and/or model instabilities, etc.); preferences; and/or the like.

As used herein in association with values (e.g., terms of magnitude, measurement, and/or other degrees of qualitative and/or quantitative observations that are used herein with respect to characteristics (e.g., dimensions, measurements, attributes, components, etc.) and/or ranges thereof, of tangible things (e.g., products, inventory, etc.) and/or intangible things (e.g., data, electronic representations of currency, accounts, information, portions of things (e.g., percentages, fractions), calculations, data models, dynamic system models, algorithms, parameters, etc.), "about" and "approximately" may be used, interchangeably, to refer to a value, configuration, orientation, and/or other characteristic that is equal to (or the same as) the stated value, configuration, orientation, and/or other characteristic or equal to (or the same as) a value, configuration, orientation, and/or other characteristic that is reasonably close to the stated value, configuration, orientation, and/or other characteristic, but that may differ by a reasonably small amount such as will be understood, and readily ascertained, by individuals having ordinary skill in the relevant arts to be attributable to measurement error; differences in measurement and/or manufacturing equipment calibration; human error in reading and/or setting measurements; adjustments made to optimize performance and/or structural parameters in view of other measurements (e.g., measurements associated with other things); particular implementation scenarios; imprecise adjustment and/or manipulation of things, settings, and/or measurements by a person, a computing device, and/or a machine; system tolerances; control loops; machine-learning; foreseeable variations (e.g., statistically insignificant variations, chaotic variations, system and/or model instabilities, etc.); preferences; and/or the like.

Although the term "block" may be used herein to connote different elements illustratively employed, the term should not be interpreted as implying any requirement of, or particular order among or between, various blocks disclosed herein. Similarly, although illustrative methods may be represented by one or more drawings (e.g., flow diagrams, communication flows, etc.), the drawings should not be interpreted as implying any requirement of, or particular order among or between, various steps disclosed herein. However, certain embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items, and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information.

As used herein, the term "optimal" refers to a value, conclusion, result, setting, circumstance, and/or the like, that may facilitate achieving a particular objective, and is not meant to necessarily refer to a single, most appropriate, value, conclusion, result, setting, circumstance, and/or the like. That is, for example, an optimal value of a parameter may include any value of that parameter that facilitates achieving a result (e.g., a segmentation that is more appropriate for an image than the segmentation achieved based on some other value of that parameter). Similarly, the term "optimize" refers to a process of determining or otherwise identifying an optimal value, conclusion, result, setting, circumstance, and/or the like.

SUMMARY

In one embodiment, a method of performing focused web crawling is disclosed using a processor coupled to at least one database for storing data related to the web crawling via a computer network. In accordance with these embodiments, the method includes accessing, using a web crawler, a first web page, and obtaining, using the web crawler, a first plurality of links from the first web page. The method includes determining, using the web crawler, a first plurality of link scores, wherein each link score of the first plurality of link scores is associated with one of the first plurality of links, wherein each link score of the first plurality of link scores corresponds to a probability that the associated link leads to a web page of a target page type, and adding, using the web crawler, the first plurality of links, and the associated link scores, to a priority queue, wherein the priority queue comprises an arrangement of at least the first plurality of links and the associated link scores, and wherein the arrangement is sorted by link score. The method includes accessing, using the web crawler, a second web page using a highest-ranked link in the priority queue, and determining, using the web crawler, whether the second web page comprises the target page type. If the second web page comprises the target page type, the method includes extracting, using the web crawler, a set of target information from the second web page, wherein, if the second web page comprises a page type other than the target page type, the method further comprises obtaining, using the web crawler, a second plurality of links from the second web page; determining, using the web crawler, a second plurality of link scores, wherein each link score of the second plurality of link scores is associated with one of the second plurality of links; and adding, using the web crawler, the second plurality of links, to the priority queue based on the link scores associated with the second plurality of links and the link scores associated with the first plurality of links.

In one embodiment, the second plurality of link scores is determined based on key words or characters in or around the second plurality of links.

In another embodiment, the method further includes accessing, using the web crawler, a third web page using a highest-ranked link in the priority queue and determining, using the web crawler, whether the third web page comprises the target page type.

In yet another embodiment, the target page type comprises a personnel directory. In one example, the personnel directory comprises a faculty directory associated with an institution of higher learning.

In still another embodiment, the method further includes applying a plurality of parsers to the second web page, each of the plurality of parsers corresponding to one of a plurality of document formats; receiving a plurality of parser outputs from the plurality of parsers, wherein each parser output of the plurality of parser outputs is generated by one of the plurality of parsers; and determining, based on the plurality of parser outputs, a document format type corresponding to the second web page.

In still yet another embodiment, determining whether the second web page comprises the target page type comprises utilizing a classifier. In one example, the classifier is configured to determine a likelihood that the second web page comprises the target page type. In another example, determining that the second web page comprises the target page type comprises determining that the likelihood is greater than zero.

In another embodiment, a system for focused web crawling over a computer network is disclosed. The system includes at least one processor coupled to at least one database for storing data related to the web crawling via the computer network, and one or more computer-readable media having computer-executable instructions embodied thereon, wherein, upon being executed by the at least one processor, the computer-executable instructions cause the at least one processor to instantiate a plurality of computer program components. The plurality of computer program components includes a navigator configured to: (1) access a first web page; (2) obtain a first plurality of links from the first web page; (3) determine a first plurality of link scores, wherein each link score of the first plurality of link scores is associated with one of the first plurality of links, wherein each link score of the first plurality of link scores corresponds to a probability that the associated link leads to a web page of a target page type; (4) add the first plurality of links, and the associated link scores, to a priority queue, wherein the priority queue comprises an arrangement of at least the first plurality of links and the associated link scores, and wherein the arrangement is sorted by link score; and (5) access a second web page, the second web page corresponding to a highest-ranking link in the priority queue.

Further, the plurality of computer program components includes a classifier configured to determine whether the second web page comprises the target page type, and an extractor configured to extract, if the second web page comprises the target page type, a set of target information from the second web page wherein, if the second web page comprises a page type other than the target page type, the navigator is further configured to: obtain a second plurality of links from the second web page; determine a second plurality of link scores, wherein each link score of the second plurality of link scores is associated with one of the second plurality of links; and add the second plurality of links, and the associated link scores, to the priority queue.

In a certain embodiment, the extractor is further configured to obtain a structure context from the second web page, wherein the navigator is configured to determine the second plurality of link scores based on at least the structure context. In another embodiment, the structure context comprises a document format context. In yet another embodiment, the target page type comprises a personnel directory. In still another embodiment, the personnel directory comprises a faculty directory associated with an institution of higher learning. In still yet another embodiment, the extractor comprises a plurality of parsers and is configured to extract the target information by: applying the plurality of parsers to the second web page, each of the plurality of parsers corresponding to one of a plurality of document formats; receiving a plurality of parser outputs from the plurality of parsers, wherein each parser output of the plurality of parser outputs is generated by one of the plurality of parsers; and determining, based on the plurality of parser outputs, a document format type corresponding to the second web page.

In one example, the classifier is configured to determine a likelihood that the second web page comprises the target page type. In another example, the classifier is configured to determine that the second web page comprises the target page type by determining that the likelihood is greater than zero.

In yet another embodiment, one or more computer-readable media having computer-executable instructions embodied thereon is disclosed wherein the computer-executable instructions configured to cause at least one processor, upon being executed by the at least one processor, to perform a method of focused web crawling over a computer network. The method includes accessing a first web page, obtaining a first plurality of links from the first web page, and determining a first plurality of link scores, wherein each link score of the first plurality of link scores is associated with one of the first plurality of links, wherein each link score of the first plurality of link scores corresponds to a probability that the associated link leads to a web page of a target page type. The method includes adding the first plurality of links, and the associated link scores, to a priority queue, wherein the priority queue comprises an arrangement of at least the first plurality of links and the associated link scores, and wherein the arrangement is sorted by link score. The method includes accessing a second web page, the second web page corresponding to a highest-ranked link in the priority queue, and determining whether the second web page comprises the target page type. If the second web page comprises the target page type, the method includes extracting a set of target information from the second web page, wherein, if the second web page comprises a page type other than the target page type, the method comprises: obtaining a second plurality of links from the second web page; determining a second plurality of link scores, wherein each link score of the second plurality of link scores is associated with one of the second plurality of links; and adding the second plurality of links, and the associated link scores, to the priority queue.

In an embodiment, the extractor is further configured to obtain a document format context from the second web page, wherein the navigator is configured to determine the second plurality of link scores based on at least the document format context. In another embodiment, the personnel directory comprises a faculty directory associated with an institution of higher learning.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

Figure 1:
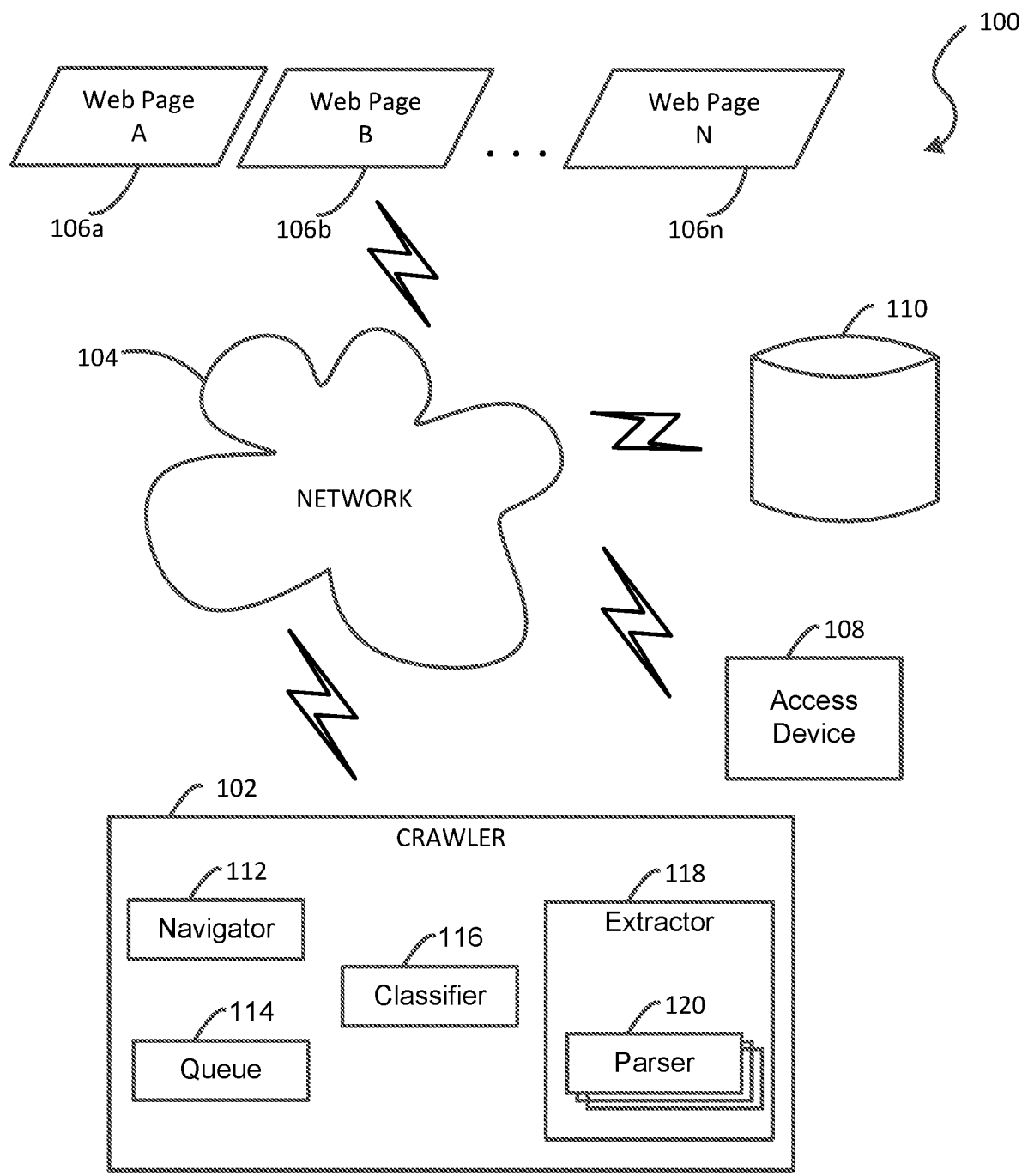
FIG. 1 is a schematic diagram of an illustrative web crawling system, in accordance with embodiments of the subject matter disclosed herein.

While the disclosed subject matter is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

FIG. 1 shows an illustrative web crawler 102 as part of a networking system 100, in accordance with embodiments of the disclosure. Additionally, various components depicted in FIG. 1 may be, in various embodiments, integrated with various ones of the other components depicted therein (and/or components not illustrated), all of which are considered to be within the ambit of the subject matter disclosed herein. Any number of components of the system 100 may be implemented using one or more computing devices. For example, the crawler 102 and/or access device 108 may be implemented on one or more computing devices.

In FIG. 1, the system 100 includes the crawler 102 designed to provide an improved navigation, via a network 104, for web pages 106a-106n (collectively 106) and collect relevant information stored in one or more of the web pages 106. In one embodiment, the crawler 102 uses web crawler architecture to be distributed in the network 104 for navigating the web pages 106. For example, in some embodiments the crawler is a web-bot or robot that crawls in the network 104 to execute automated tasks for identifying and collecting relevant information about desired topics found on the web pages 106. The crawler 102 can be programmed software applications or hardware circuits running on a microprocessor to crawl the network 104, such that desired information is collected from the web pages 106. In one example, the crawler 102 is used to capture unique identifiers of the web pages 106. Unlike existing crawlers that scan only the Hypertext Markup Language (HTML), the crawler 102 is configured to perform a rendering process to browse each web page including underlying source or execution codes (e.g., JavaScript or portable document format codes). The crawler 102 may further use other suitable codes known in the art to suit different applications.

The crawler may be configured to work with any type of computer network having a collection of computers, servers, and other hardware interconnected by communication channels, such as the Internet, Intranet, Ethernet, LAN, etc. In one embodiment, the crawler 102 interfaces with the network 104, such as a wireless communication facility (e.g., a Wi-Fi access point), and performs an automated information collection process for collecting the relevant information that is desired by a user or other systems. Other similar networks known in the art are also contemplated.

In one embodiment, an access device 108 is used to access the web pages 106 via the network 104, and includes the crawler 102 as a single unit. In another embodiment, a separate access device 108 is operatively connected to the crawler 102 via the network 104 to perform the automated information collection process. All relevant information can be stored in a database 110, e.g., as a non-transitory data storage device and/or a machine-readable data storage medium carrying computer-readable information and/or computer-executable instructions, for retrieval by the crawler 102, the access device 108, and other associated systems and programs.

In one embodiment, the crawler 102 includes a navigator 112, a priority queue 114, a classifier 116, an extractor 118, and a parser 120. For example, the navigator 112 is configured to access a first web page 106a, obtain a first plurality of links from the first web page 106a, and determine a first plurality of link scores. Each link score of the first plurality of link scores is associated with one of the first plurality of links. Each link score of the first plurality of link scores corresponds to a probability that the associated link leads to a web page of a target page type. In some embodiments, the crawler 102 determines a link score by analyzing the text within a hyperlink and/or around the hyperlink. For example, if a user were searching for a directory, then the crawler could have a set of key terms and characters that are typically used with links pointing to webpages containing directories. That set of key terms and characters could include, for example, the words "faculty," "directory," and/or "people." The crawler 102 can then assign a score based on the number of key words in or around that hyperlink. In some embodiments, the crawler provides an absolute score to each hyperlink, while in other embodiments the crawler provides a relative score to each hyperlink in comparison to other hyperlinks within the first plurality of links.

Further, the navigator 112 is configured to add the first plurality of links, and the associated link scores, to the priority queue 114. For example, the priority queue 114 includes an arrangement of at least the first plurality of links and the associated link scores. In one embodiment, the arrangement is sorted by link score so that the link having the highest score is retrieved for subsequent navigation. The navigator 112 is also configured to access a second web page 106b, wherein the second web page 106b corresponds to a highest-ranking link in the priority queue 114.

The classifier 116 is configured to determine whether the second web page 106b includes a target page type or target page, such as a personnel directory. For example, the personnel directory can be a faculty directory associated with an institution of higher learning. During operation, the classifier 116 determines a likelihood that the second web page 106b has the target page type, and also determines that the second web page 106b includes the target page type by determining that the likelihood is greater than zero. Balancing the speed and accuracy, that threshold can be set to specific values (e.g., 20%, 50%, 75%, 90% and the like).

In some embodiments, and using the example above, the crawler 102 uses a random forest classifier to decide whether a page is likely to have a personnel directory (i.e., is a target page type). To that end, the crawler 102 searches for motifs commonly found on faculty directories, such as names, phone numbers, email addresses, and job titles. As one of skill will readily appreciate, information is organized in thousands of different formats and organizational structures. The complexity is compounded by the fact that the underlying machine code (as opposed to the human readable output) can further obfuscate the organizational structure of the webpage information. To address this issue, the crawler 102 in some embodiments leverages machine learning to quickly identify motifs and/or repeated patterns. In these embodiments, the crawler 102 is trained using a set of known target pages (e.g., known personnel directories) with various organizational structures and in various computing languages. The trained crawler 102 can then be used to identify motifs and thereby determine the likelihood that an unknown page is a target page (e.g., that it contains a personnel directory or some other target information). As the crawler 102 identifies webpages highly likely to be target pages, the crawler 102 can use those identified webpages as additional training examples (either automatically or after human review and confirmation) to expand the capabilities of the crawler 102.

If the second web page 106b includes a page type other than the target page type, the navigator 112 obtains a second plurality of links from the second web page 106b, and determines a second plurality of link scores. As similarly with the first plurality of link scores, each link score of the second plurality of link scores is associated with one of the second plurality of links. The navigator 112 then adds the second plurality of links, and the associated link scores, to the priority queue 114. In this manner, the crawler 102 can organize the links within the priority queue 114 according to their respective link scores, regardless of whether the links were originally on the first web page or the second web page (or a subsequent web page).

The navigator 112 can then access a third web page using the highest-ranking link in the priority queue, and this sub-process is repeated until the crawler 102, using the classifier 116, identifies a webpage with the target content.

If the crawler 102 determines that the second webpage 106b is a target page or a target page type, the navigator 112 obtains a structure context from that webpage. For example, the structure context comprises a document format context. In one example, the document format context includes at least one of: an HTML context, a programming script context (e.g., JavaScript), and a portable document format (PDF) context (e.g., PDF code). Other suitable document format contexts, such as eXtensible Markup Language (XML) and cXML, are also contemplated to suit different applications.

In one embodiment, the extractor 118 includes a plurality of parsers 120 and is configured to extract the target information by applying the plurality of parsers 120 to the second web page 106b. Each of the plurality of parsers 120 corresponds to one of a plurality of document formats. For example, as discussed above, the document formats can be an HTML format, a JavaScript format, or a PDF code format. The extractor 118 receives a plurality of parser outputs from the plurality of parsers 120, and each parser output of the plurality of parser outputs is generated by one of the plurality of parsers 120. The extractor 118 determines, based on the plurality of parser outputs, a document format type corresponding to the second web page 106b. For example, the document format type can be an HTML type, a JavaScript type, or a PDF type.

Figure 2:
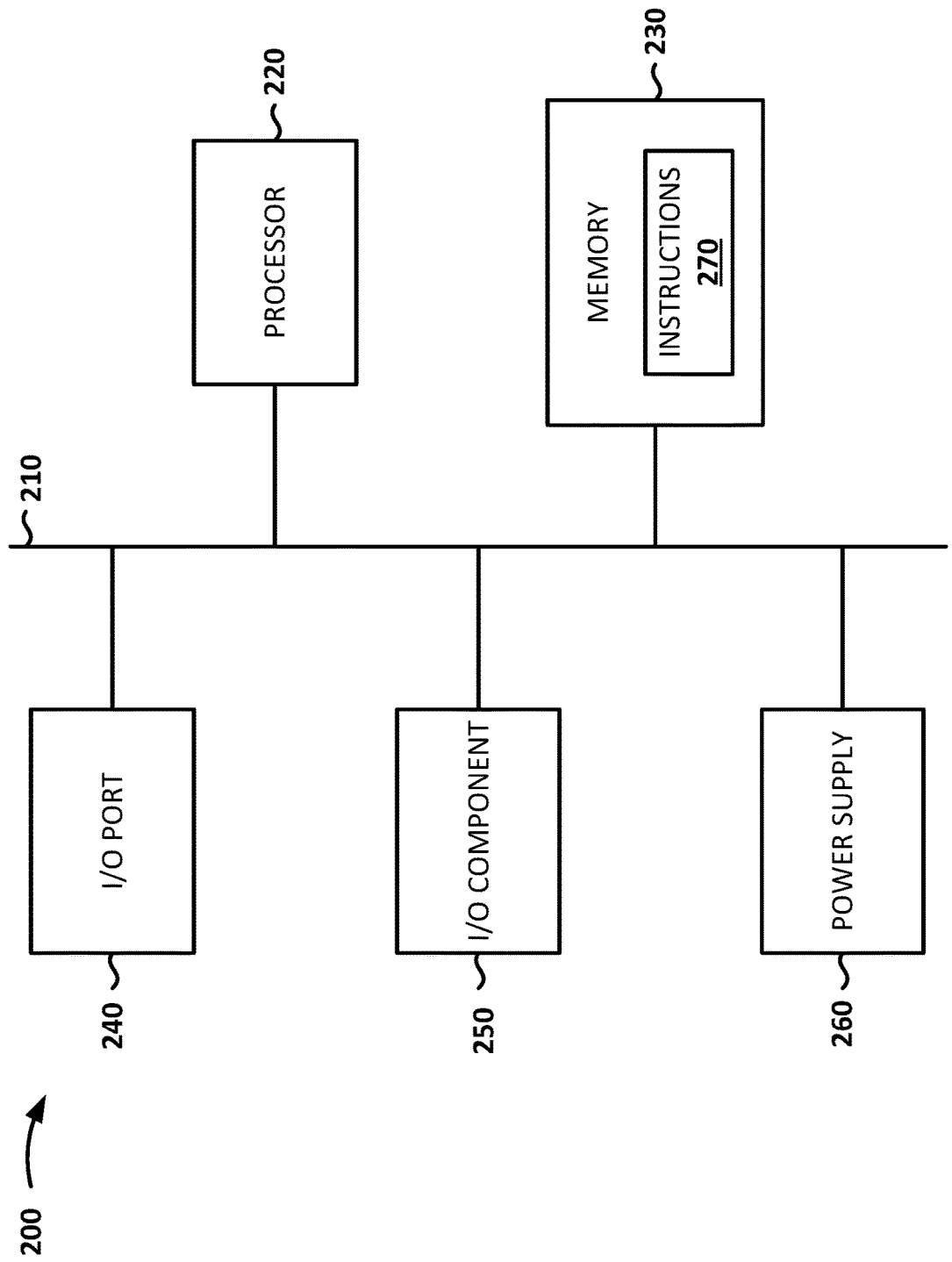
FIG. 2 is a block diagram depicting an illustrative computing device, in accordance with embodiments of the subject matter disclosed herein.

FIG. 2 is a block diagram depicting an illustrative computing device 200 incorporated in the system 100 in accordance with embodiments of the disclosure. The computing device 200 may include any type of computing device suitable for implementing aspects of embodiments of the disclosed subject matter. Examples of computing devices include specialized computing devices or general-purpose computing devices such "workstations," "servers," "laptops," "desktops," "tablet computers," "hand-held devices," "smartphones," "general-purpose graphics processing units (GPGPUs)," and the like, all of which are contemplated within the scope of FIGS. 1 and 2, with reference to various components of the system 100 and/or computing device 200.

In embodiments, the computing device 200 includes a bus 210 that, directly and/or indirectly, couples the following devices: a processor 220, a memory 230, an input/output (I/O) port 240, an I/O component 250, and a power supply 260. Any number of additional components, different components, and/or combinations of components may also be included in the computing device 200. The I/O component 250 may include a presentation component configured to present information to a user such as, for example, a display device, a speaker, a printing device, and/or the like, and/or an input component such as, for example, a microphone, a joystick, a satellite dish, a scanner, a printer, a wireless device, a keyboard, a pen, a voice input device, a touch input device, a touch-screen device, an interactive display device, a mouse, and/or the like.

The bus 210 represents what may be one or more busses (such as, for example, an address bus, data bus, or combination thereof). Similarly, in embodiments, the computing device 200 may include a number of processors 220, a number of memory components 230, a number of I/O ports 240, a number of I/O components 250, and/or a number of power supplies 260. Additionally any number of these components, or combinations thereof, may be distributed and/or duplicated across a number of computing devices.

In embodiments, the memory 230 includes computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; and/or any other medium that can be used to store information and can be accessed by a computing device such as, for example, quantum state memory, and/or the like. In embodiments, the memory 230 stores computer-executable instructions 270 for causing the processor 220 to implement aspects of embodiments of system components discussed herein and/or to perform aspects of embodiments of methods and procedures discussed herein.

The computer-executable instructions 270 may include, for example, computer code, machine-useable instructions, and the like such as, for example, program components capable of being executed by one or more processors 220 associated with the computing device 200. Program components may be programmed using any number of different programming environments, including various languages, development kits, frameworks, and/or the like. Some or all of the functionality contemplated herein may also, or alternatively, be implemented in hardware and/or firmware.

The illustrative computing device 200 shown in FIG. 2 is not intended to suggest any limitation as to the scope of use or functionality of embodiments of the present disclosure. The illustrative computing device 200 also should not be interpreted as having any dependency or requirement related to any single component or combination of components illustrated therein. Additionally, various components depicted in FIG. 2 may be, in embodiments, integrated with various ones of the other components depicted therein (and/or components not illustrated), all of which are considered to be within the ambit of the present disclosure.

Figure 3:
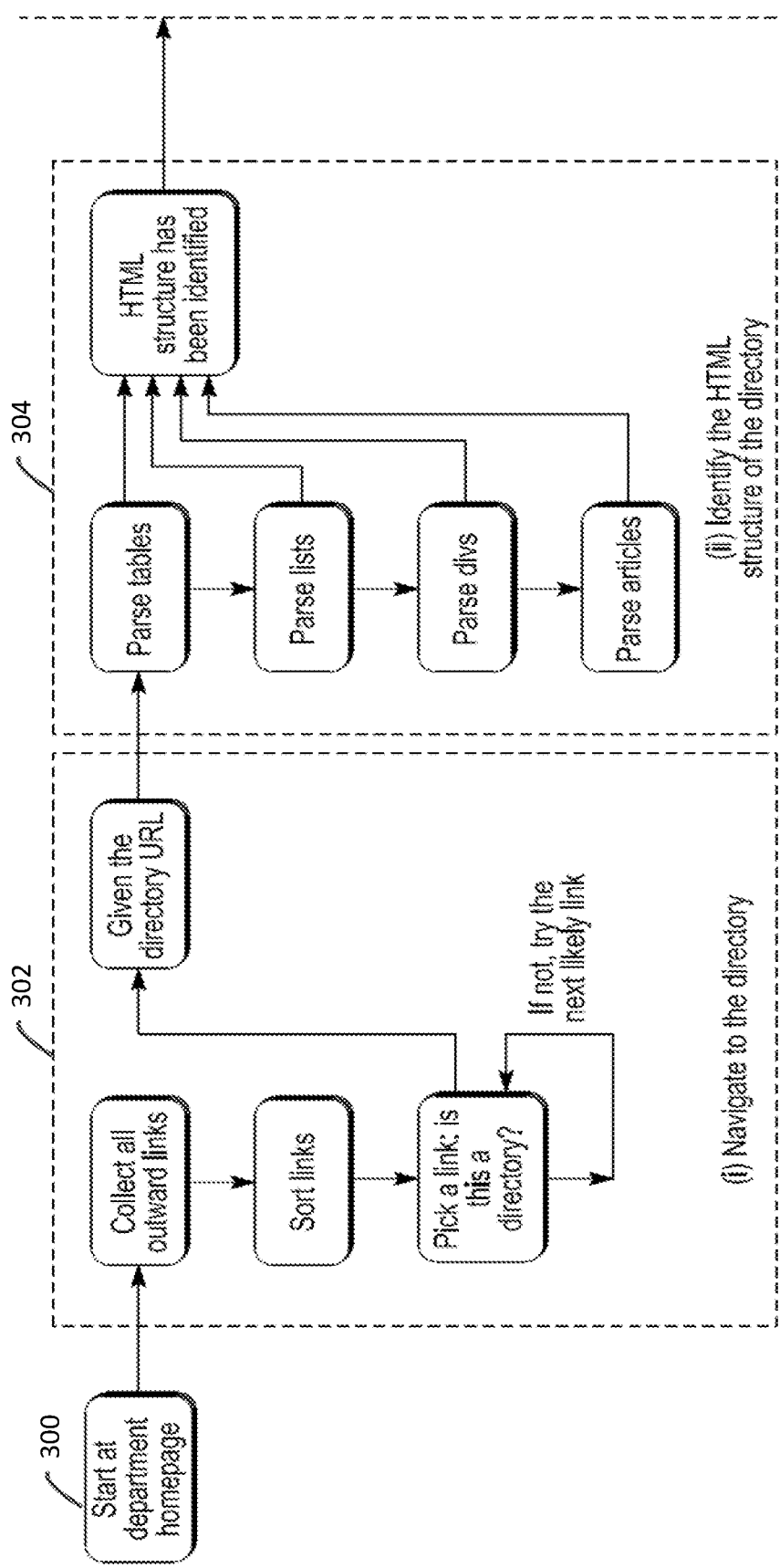
FIG. 3 is a block diagram depicting an illustrative information collection process of the web crawling system of FIG. 1, in accordance with embodiments of the subject matter disclosed herein.
Figure 3:
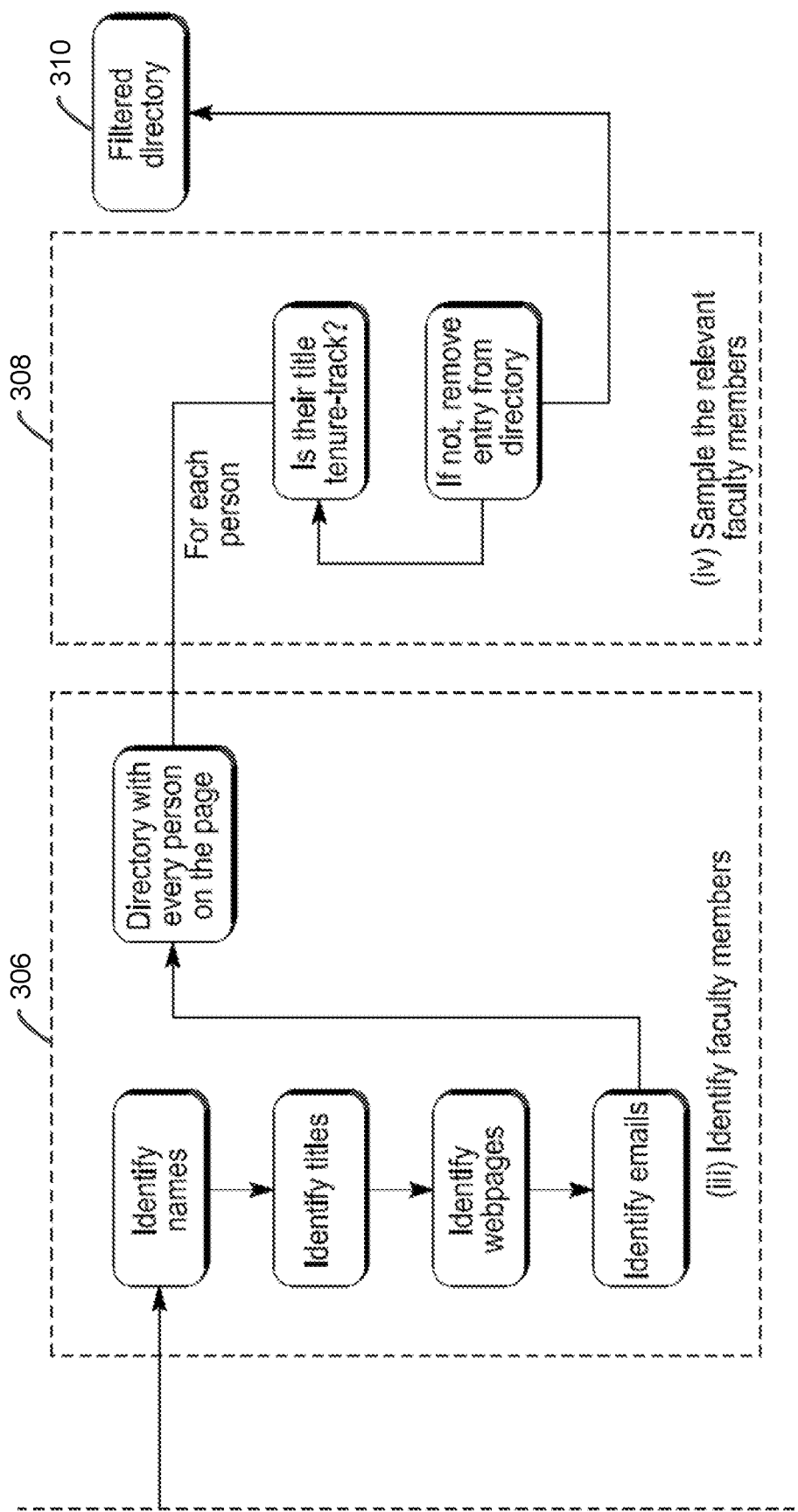

FIG. 3 shows an illustrative information collection process of the web crawling system 100 in accordance with embodiments of the subject matter disclosed herein. In FIG. 3, a method of performing the automated information collection process is shown. As an example, the crawler 102 finds and parses departmental directories, as a target page type, in four steps: (i) efficiently navigating to a department's directory, (ii) identifying the HTML structure separating entries within the directory, (iii) extracting faculty records by identifying names, titles, webpages, and email addresses, and (iv) filtering this list to include only tenured or tenure-track (TTT) faculty members. As shown in steps (i) and (iv) of FIG. 3, the crawler 102 can generate one or more false positive errors and one or more false negative errors. The false positive error refers to a condition where the crawler 102 falsely identifies the link as a target page type. The false negative error refers to a condition where the crawler 102 falsely identifies the link as a non-target page type. Thus, the false negative errors imply either the missed opportunity to scrape a directory or the omission of a TTT faculty member. However, the false positive errors can be corrected via down-stream analyses, typically at a cost of extra computation with the parsing of a candidate's resume or the manual verification of very specific information.

At block 300, the crawler 102, using the navigator 112, accesses a first web page 106a, such as a department homepage. At block 302, the crawler 102 obtains all outward links embedded in the first web page 106a, and accesses the second web page 106b using the outward links from the first web page 106a. In one embodiment, the crawler 102 performs two primary components: (i) navigate efficiently from a department's homepage to their directory, and (ii) identify whether a page appears to be a directory. For example, in order to navigate to the desired faculty directories, the crawler 102 decides which hyper-links to follow. Starting from the department's homepage, the crawler 102 adds all outgoing hyperlinks to the priority queue 114, with priorities set equal to the number of keywords found within each URL and its surrounding text. For example, this keyword list has 25 words, including "faculty," "directory," and "people," which are manually extracted from common features of departments' directory URLs. In other embodiments, the keyword list can include a different number of words, characters and/or other features that can be used to determine that the link points to a target webpage. The crawler 102 then visits pages in order of their priority, keeping track of any URLs that have already been visited, and adding newly discovered URLs to the queue 114 as it goes and prioritizing the queue as new hyperlinks are added and then searching the highest priority link, until it reaches a directory web page.

For each visited page, the crawler 102 decides whether that page is a target page, in this example, a directory to parse. To avoid parsing every likely page for faculty members, the crawler 102 uses a random forest classifier to decide whether a page is likely to be worth fully parsing for faculty listing information. Each web page is characterized by counting motifs commonly found on faculty directories, such as names, phone numbers, email addresses, and job titles. Since faculty directories typically contain little other text, a page's feature set includes counts of these motifs as a fraction of all words. A false negative, overlooking a faculty directory, may be an unrecoverable error, and may induce a group of correlated false negatives for faculty during the navigation. In one example, a directory classifier that has no false negatives at the expense of more false positives is desired. Any pages that yield a likelihood greater than zero are passed to the next stage. Additionally, parsing a non-directory page is relatively inexpensive in terms of computational time and, since no faculty is likely to be extracted from this page, these pages are easy to subsequently identify as false positives.

At block 304, the crawler 102, using the extractor 118, extracts the target information from the second web page 106b that corresponds to the highest-ranking link in the priority queue 114. In one embodiment, when the navigator 112 discovers a directory, the extractor 118 extracts relevant information from a variety of HTML formatting conventions, such as HTML tags shown in FIG. 4. Illustrative HTML tags are described below in paragraphs relating to FIG. 4. In use, despite many variations in the visual styling of these web pages, there is a short list of common HTML tags that separate faculty members from each other, e.g., divs, tables, lists and articles. For example, to parse data from these structures, the extractor 118 can have four corresponding parsers 120, one for each HTML format. The extractor 118 applies each of these parsers 120 to a department's directory and assigns an HTML-format type based on which parser returned the most faculty members.

When the extractor 118 reaches a web page that the directory classifier 116 decides is a directory, the extractor applies each of the parsing methods in a sequence (e.g., tables, lists, divs, and articles). In some embodiments, the sequence can go in different orders (e.g., lists, tables, divs, and articles or other variations). This sequence may be stopped early if a predetermined number of faculty records are obtained. In this step, the extractor 118 also identifies whether the department has a multi-page directory. If so, the extractor 118 collects the list of links and applies a parser 120 to each page. If no faculty members are collected from the page, the extractor 118 logs the output and moves to the next highest priority URL in the queue 114.

At block 306, the extractor 118 identifies faculty members using the parsers 120 based on the corresponding document format. For example, after the HTML structure separating faculty members from each other has been identified, the next step is to extract faculty information from the web page 106b. Each directory consists of repeated HTML elements, and all faculty directories contain similar information: first and last names, titles, email addresses, and faculty homepage links. This repetition in HTML and content allows the extractor 118 to distinguish individual faculty records, and extract the target information. For example, the extractor 118 can identify each faculty attribute based on a set of keyword-matching heuristics, each based on a whitelist of known relevant strings.

In one embodiment, to detect and extract names, the extractor 118 generates a whitelist of first and last names from the database 110 having computer science faculty data. If a string contained a single substring that can be found in this set of names, the extractor 118 classifies that string as a name. As directories are scraped, the extractor 118 can add any previously unseen names to the whitelist. In one example, a more exhaustive list of names can be constructed from other publicly available data, e.g., family names from the U.S. Census or author names in bibliographic databases.

The extractor 118 then extracts titles and email addresses from the text between names. For titles, it employs a whitelist of relevant keywords, composed of the set of all titles for TTT and non-TTT faculty. If the extractor 118 cannot find a title relevant to a name, it omits that entry from the directory. Typically, email addresses can be identified using simple regular expressions. In some embodiment, emails are obfuscated on a directory page. The most common obfuscation method is to remove any shared suffix (e.g., "@colorado.edu").

The extractor 118 also searches for faculty webpage URLs. In one example, only webpages included as links surrounding the names of faculty members are identified. These URLs can be provided as input for the collection of faculty curriculum vitas. At the end of this stage, the extractor 118 generates an exhaustive list of every person on the directory. This list can contain true positives, the records of TTT faculty, as well as false positives, which are any other individuals. This set of records is a superset of an in-sample faculty searched.

At block 308, these false positives are removed by the extractor 118. For example, in addition to TTT faculty, department faculty rosters may list many other kinds of individuals, including affiliated, courtesy, teaching or research faculty, various staff or non-faculty administrative positions, and sometimes trainees like postdocs or graduate students. In one embodiment, the extractor 118 performs a filtering process based on predetermined criteria. For example, the filtering criteria can be applied to produce a different kind of directory, e.g., all research faculty, contingent faculty (adjunct, adjoint, etc.), or teaching faculty. As another example, the filtering criteria can be used to restrict the pages to faculty whose primary affiliation is within a specific department, e.g., Computer Science Department, which may exclude affiliated faculty and courtesy appointments.

To perform this filtering, for example, the extractor 118 generates a blacklist of titles that signify non-TTT faculty and staff, such as adjoint, staff, emeritus, and lecturer. Another example is that the blacklist can be department specific filters. For example, some Computer Science (CS) faculties are housed in joint Electrical Engineering and Computer Science (EECS) departments, and so the extractor 118 also checks whether a person is flagged as computer science faculty. For example, if a title contains the substrings "of," "from," or "in," it checks whether that string contains a computing related word from a short custom-built whitelist. Faculty research interests can be distinguished using topic modeling on publication titles. In some embodiments, filtering faculty by research field in this stage can be automated using publication data.

At block 310, the extractor 118 generates a filtered directory as a list of the relevant faculty members based on desired filtering criteria. In one example, the generated filtered directory includes only TTT faculty members.

Figure 4:
FIG. 4 is a schematic representation of illustrative hypertext markup language structures having faculty information, in accordance with embodiments of the subject matter disclosed herein.
Figure 4:
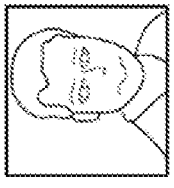

FIG. 4 shows illustrative hypertext markup language structures having faculty information, in accordance with embodiments of the subject matter disclosed herein. In FIG. 4, three examples of displaying the wide variety of HTML structures are shown. For example, the HTML structures separate faculty information based on a tag type. In these examples, the rendered HTML tags for directories include lists <li>, tables <table> and divs <div>. In one example 400, the list tags <li> can be used to denote faculty member's names and departments. In another example 402, the table cell tags <td> can be used to denote faculty member's names and titles. In yet another example 404, the generic container tags <div> can be used to denote faculty member's names and titles. As such, each directory consists of repeated HTML elements, and all faculty directories contain similar information, and the information can be extracted by the extractor 118 using one or more parsers 120.

Figure 5:
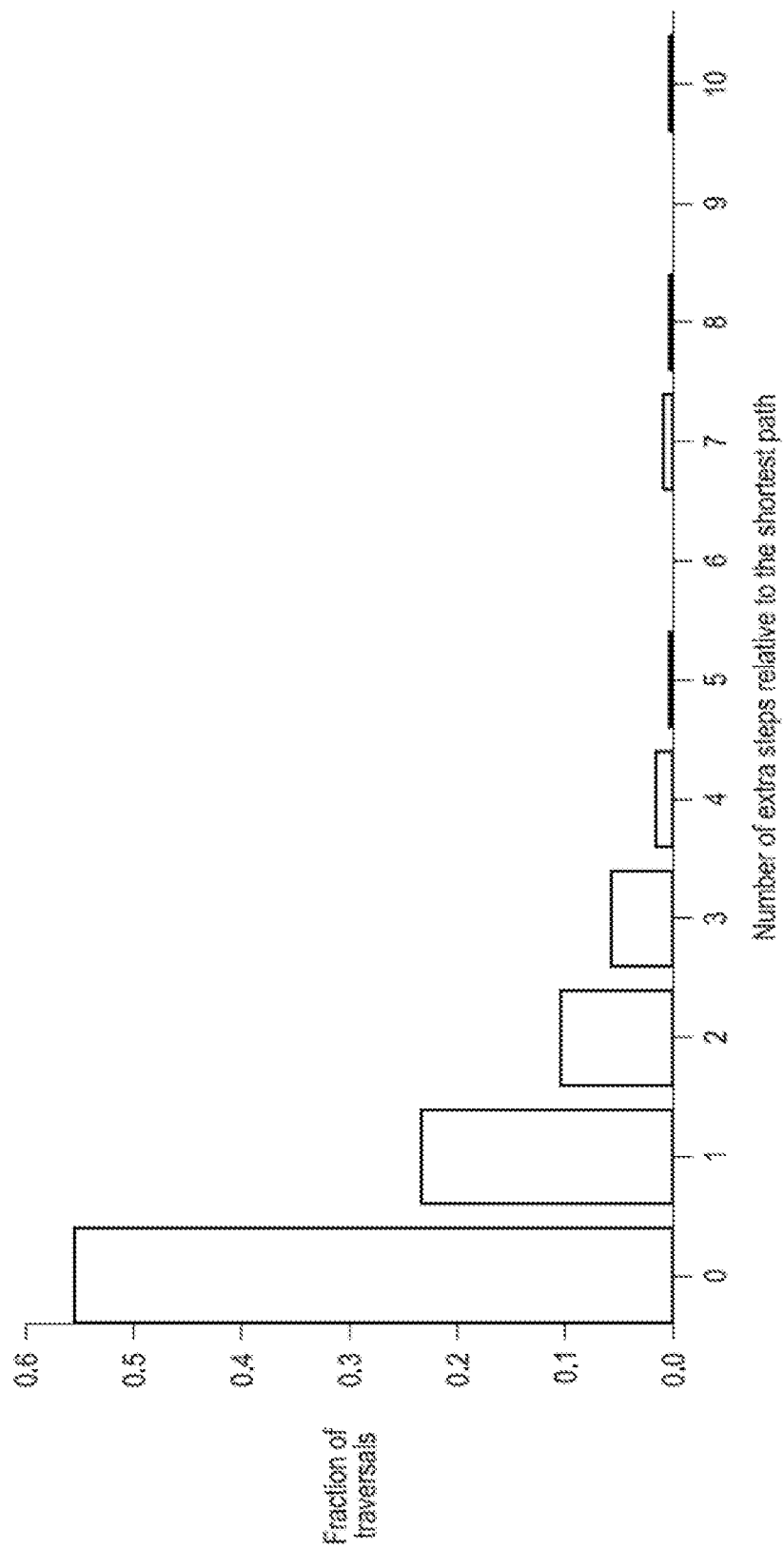
FIG. 5 is a graphical representation depicting an illustrative efficiency of the web crawling system, in accordance with embodiments of the subject matter disclosed herein.
Figure 6:
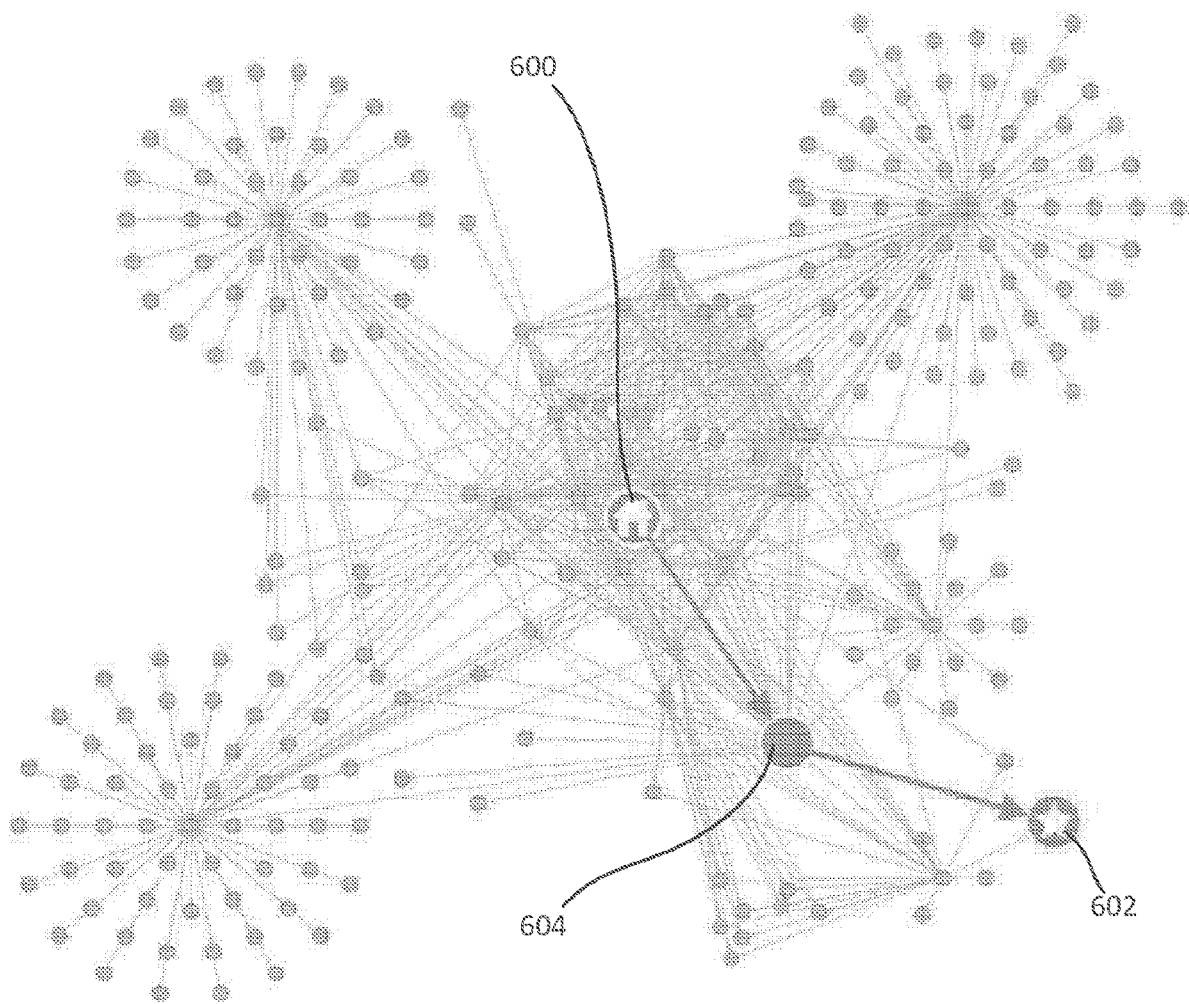
FIG. 6 is a graphical representation of a network of linked webpages, in accordance with embodiments of the subject matter disclosed herein.

FIG. 5 shows an illustrative efficiency of the web crawling system 100. In FIG. 5, a difference of zero means that the crawler 102 makes as many HTTP requests as the shortest path possible between the homepage and the directory page. For more than half (56%) of departments, the navigation heuristic is optimal, and on average makes only 0.88 excess HTTP requests relative to optimality. This navigation step takes on average 15 CPU seconds per department. In one example, the average time to parse a page is 24 CPU seconds and a breadth-first crawl visits 62 pages, on average, to find the directory. Thus, the most naive implementation of the crawler 102 takes about 1488 CPU seconds per department. In comparison, it was discovered empirically that the navigation approach detailed here, without the crawler 102, takes 57 CPU seconds on average, while navigating intelligently and using the directory classifier takes only 55 CPU seconds.

Thus, it is advantageous that the crawler 102 can quickly and automatically assemble a full census of an academic field using digital data available on the computer network 104, such as the public World Wide Web. Thus, the system 100 improves the computer network technology by resolving the drawbacks discussed above. The system 100 is more efficient and accurate than existing crawlers, and the system 100 can be adapted to any academic discipline or used for continuous collection. This system 100 runs to completion as a single-threaded process on off-the-shelf computing hardware in a few hours for a single academic field, which is a substantial improvement over the roughly 1600 hours required to do this task by hand. By assembling an accurate census of an entire field from online information alone, this system 100 facilitates new research on the composition of academic fields by providing cost-effective access to complete faculty listings, without relying on surveys or professional societies. This system 100 can also be used longitudinally to study how the workforce composition does or does not change over time, which would be particularly valuable for assessing policies meant to broaden participation or improve retention. Finally, applied to many academic fields in parallel, this system 100 can reveal how scientists move between different disciplines and relate those labor flows to scientific advances. In short, a large number of important research questions will benefit from the availability of accurate and low-cost census data provided by the system 100.

Various modifications and additions can be made to the exemplary embodiments discussed without departing from the scope of the presently disclosed subject matter. For example, while the embodiments described above refer to particular features, the scope of this disclosure also includes embodiments having different combinations of features and embodiments that do not include all of the described features. Accordingly, the scope of the subject matter disclosed herein is intended to embrace all such alternatives, modifications, and variations as fall within the scope of the claims, together with all equivalents thereof.

We claim:

1. A method of performing focused web crawling using a processor (220) coupled to at least one database (110) for storing data related to the web crawling via a computer network (104), comprising:
   accessing, using a web crawler (102), a first web page (106a);
   obtaining, using the web crawler, a first plurality of links from the first web page (106a);
   determining, using the web crawler, a first plurality of link scores, wherein each link score of the first plurality of link scores is associated with one of the first plurality of links, wherein each link score of the first plurality of link scores corresponds to a probability that the associated link leads to a web page (106) of a target page type;
   adding, using the web crawler, the first plurality of links, and the associated link scores, to a priority queue (114), wherein the priority queue (114) comprises an arrangement of at least the first plurality of links and the associated link scores, and wherein the arrangement is sorted by link score;
   accessing, using the web crawler, a second web page (106b) using a highest-ranked link in the priority queue (114);
   determining, using the web crawler, whether the second web page (106b) comprises the target page type; and
   if the second web page (106b) comprises the target page type, extracting, using the web crawler, a set of target information from the second web page (106b),
   wherein, if the second web page (106b) comprises a page type other than the target page type, the method further comprises:
      obtaining, using the web crawler, a second plurality of links from the second web page (106b);
      determining, using the web crawler, a second plurality of link scores, wherein each link score of the second plurality of link scores is associated with one of the second plurality of links; and
      adding, using the web crawler, the second plurality of links, to the priority queue (114) based on the link scores associated with the second plurality of links and the link scores associated with the first plurality of links.

2. The method of claim 1, wherein the second plurality of link scores is determined based on key words or characters in or around the second plurality of links.

3. The method of claim 1, further comprising accessing, using the web crawler, a third web page (106) using a highest-ranked link in the priority queue (114) and determining, using the web crawler, whether the third web page (106) comprises the target page type.

4. The method of claim 1, wherein the target page type comprises a personnel directory.

5. The method of claim 4, wherein the personnel directory comprises a faculty directory associated with an institution of higher learning.

6. The method of claim 1, further comprising:
applying a plurality of parsers (120) to the second web page (106b), each of the plurality of parsers (120) corresponding to one of a plurality of document formats;
receiving a plurality of parser (120) outputs from the plurality of parsers (120), wherein each parser (120) output of the plurality of parser (120) outputs is generated by one of the plurality of parsers (120); and
determining, based on the plurality of parser (120) outputs, a document format type corresponding to the second web page (106b).

7. The method of claim 1, wherein determining whether the second web page (106b) comprises the target page type comprises utilizing a classifier (116).

8. The method of claim 7, wherein the classifier (116) is configured to determine a likelihood that the second web page (106b) comprises the target page type.

9. The method of claim 8, wherein determining that the second web page (106b) comprises the target page type comprises determining that the likelihood is greater than zero.

10. A system (100) for focused web crawling over a computer network (104), comprising:
at least one processor (220) coupled to at least one database (110) for storing data related to the web crawling via the computer network (104); and
one or more computer-readable media having computer-executable instructions (270) embodied thereon, wherein, upon being executed by the at least one processor (220), the computer-executable instructions (270) cause the at least one processor (220) to instantiate a plurality of computer program components, the plurality of computer program components comprising:
a navigator (112) configured to:
(1) access a first web page (106a);
(2) obtain a first plurality of links from the first web page (106a);
(3) determine a first plurality of link scores, wherein each link score of the first plurality of link scores is associated with one of the first plurality of links, wherein each link score of the first plurality of link scores corresponds to a probability that the associated link leads to a web page (106) of a target page type;
(4) add the first plurality of links, and the associated link scores, to a priority queue (114), wherein the priority queue (114) comprises an arrangement of at least the first plurality of links and the associated link scores, and wherein the arrangement is sorted by link score; and
(5) access a second web page (106b), the second web page (106b) corresponding to a highest-ranking link in the priority queue (114);
a classifier (116) configured to determine whether the second web page (106b) comprises the target page type; and
an extractor (118) configured to extract, if the second web page (106b) comprises the target page type, a set of target information from the second web page (106b);
wherein, if the second web page (106b) comprises a page type other than the target page type, the navigator (112) is further configured to:
obtain a second plurality of links from the second web page (106b);
determine a second plurality of link scores, wherein each link score of the second plurality of link scores is associated with one of the second plurality of links; and
add the second plurality of links, and the associated link scores, to the priority queue (114).

11. The system (100) of claim 10, wherein the extractor (118) is further configured to obtain a structure context from the second web page (106b), wherein the navigator (112) is configured to determine the second plurality of link scores based on at least the structure context.

12. The system (100) of claim 11, wherein the structure context comprises a document format context.

13. The system (100) of claim 10, wherein the target page type comprises a personnel directory.

14. The system (100) of claim 13, wherein the personnel directory comprises a faculty directory associated with an institution of higher learning.

15. The system (100) of claim 12, wherein the extractor (118) comprises a plurality of parsers (120) and is configured to extract the target information by:
applying the plurality of parsers (120) to the second web page (106b), each of the plurality of parsers (120) corresponding to one of a plurality of document formats;
receiving a plurality of parser (120) outputs from the plurality of parsers (120), wherein each parser (120) output of the plurality of parser (120) outputs is generated by one of the plurality of parsers (120); and
determining, based on the plurality of parser (120) outputs, a document format type corresponding to the second web page (106b).

16. The system (100) of claim 10, wherein the classifier (116) is configured to determine a likelihood that the second web page (106b) comprises the target page type.

17. The system (100) of claim 16, wherein the classifier (116) is configured to determine that the second web page (106b) comprises the target page type by determining that the likelihood is greater than zero.

18. One or more computer-readable media having computer-executable instructions (270) embodied thereon, the computer-executable instructions (270) configured to cause at least one processor (220), upon being executed by the at least one processor (220), to perform a method of focused web crawling over a computer network (104), the method comprising:
accessing a first web page (106a);
obtaining a first plurality of links from the first web page (106a);
determining a first plurality of link scores, wherein each link score of the first plurality of link scores is associated with one of the first plurality of links, wherein each link score of the first plurality of link scores corresponds to a probability that the associated link leads to a web page (106) of a target page type;
adding the first plurality of links, and the associated link scores, to a priority queue (114), wherein the priority queue (114) comprises an arrangement of at least the first plurality of links and the associated link scores, and wherein the arrangement is sorted by link score;
accessing a second web page (106b), the second web page (106b) corresponding to a highest-ranked link in the priority queue (114);
determining whether the second web page (106b) comprises the target page type; and if the second web page (106*b*) comprises the target page type, extracting a set of target information from the second web page (106*b*), wherein, if the second web page (106*b*) comprises a page type other than the target page type, the method comprises:

obtaining a second plurality of links from the second web page (106*b*);

determining a second plurality of link scores, wherein each link score of the second plurality of link scores is associated with one of the second plurality of links; and adding the second plurality of links, and the associated link scores, to the priority queue (114).

19. The media of claim 18, wherein the extractor (118) is further configured to obtain a document format context from the second web page (106*b*), wherein the navigator (112) is configured to determine the second plurality of link scores based on at least the document format context.

20. The media of claim 18, wherein the personnel directory comprises a faculty directory associated with an institution of higher learning.

\* \* \* \* \*